US006832238B1

United States Patent
Sharma et al.

(10) Patent No.: US 6,832,238 B1
(45) Date of Patent: Dec. 14, 2004

(54) LOCAL TRANSACTION MANAGEMENT (75) Inventors: Rahul Sharma, Sunnyvale, CA (US); Vladimir Matena, Redwood City, CA (US)

(73) Assignee: Sun Microsystems, Inc., Santa Clara, CA (US)

(*) Notice: Subject to any disclaimer, the term of this patent is extended or adjusted under 35 U.S.C. 154(b) by 0 days.

(21) Appl. No.: 09/578,266

(22) Filed: May 24, 2000

(51) Int. Cl.[7] .............................................. G06F 15/16
(52) U.S. Cl. ...................... 709/201; 709/201; 709/202; 712/28; 707/3
(58) Field of Search ................................. 709/201, 202

(56) References Cited

U.S. PATENT DOCUMENTS 5,630,081 A * 5/1997 Rybicki et al. ............. 395/348
6,243,737 B1 * 6/2001 Flanagan et al. ........... 709/202

* cited by examiner

*Primary Examiner*—Rupal Dharia
*Assistant Examiner*—Adnan Mirza
(74) *Attorney, Agent, or Firm*—Martine & Penilla, LLP (57) ABSTRACT

The present invention defines a transaction management contract between an application server and a resource adapter and its underlying resource manager that allows an application server to utilize local transactions on a resource manager and avoid the overhead of an external transaction manager. The transaction management contract incorporates two aspects that apply to different types of transactions. The first aspect provides an application level transaction contract between a transaction manager and a resource manager based on javax.transaction.xa.XAResource of the J2EE specification. The second aspect is local transaction management contract. These contracts enable application server to provide the infrastructure and runtime environment for transaction management. An application component relies on this transaction infrastructure to support its component level transaction model.

12 Claims, 6 Drawing Sheets

LOCAL TRANSACTION MANAGEMENT

The present invention relates broadly to a transaction management between software entities in a computer environment. Specifically, the present invention enables an application server to manage resource manager local transactions.

BACKGROUND

An Enterprise Information System (EIS) provides the information infrastructure for an enterprise utilizing a computer system having a client server arrangement. An EIS offers a set of services to its clients. These services are exposed to clients as local and/or remote interfaces. Examples of an EIS include enterprise resource planning (ERP) systems, transaction processing (TP) systems, and database systems. There are two aspects of an EIS: the system level services and an application specific interface.

A connector is a standard extension mechanism for application servers to provide connectivity to an EIS. A connector is specific to an EIS and consists of a resource adapter and application development tools for EIS connectivity. A resource adapter plugs into an application server through the server's support for system level contracts. As used herein, a contract refers to the respective responsibilities two or more software entities have when interacting with each other. The Java 2 Platform, Enterprise Edition (J2EE) is the platform of choice for EISs. Two of the relevant parts are an EIS vendor-provided resource adapter and an application server that allows the resource adapter to plug in. An EIS resource provides EIS-specific functionality to its clients.

A resource manager manages a set of shared EIS resources. A client requests access to a resource manager to use its managed resources. A transactional resource manager can participate in transactions that are externally controlled and coordinated by a transaction manager. A resource manager is typically in a different address space or on a different machine from the client that accesses it. A connection enables an application client to connect to a resource manager, perform transactions, and access services provided by that resource manager. A connection can be either transactional or non-transactional.

An application component can be a server-side component, such as an Enterprise Java Bean (EJB), Java server page (JSP), or a servlet that is deployed, managed, and executed on an application server. It can also be a component executed on the web-client tier but made available to the web-client by an application server. Examples of the latter type of application component include a Java applet, or a DHTML page.

A container is a part of an application server that provides deployment and runtime support for application components. It provides an integrated view of the services provided by the underlying application server for the application components. Containers can run on existing systems; for example, web servers for the web containers, application servers, transaction processing monitors, and database systems for EJB containers. This enables enterprises to leverage both the advantages of their existing systems and those of J2EE. Enterprises can write (or rewrite) new applications using J2EE capabilities and can also encapsulate parts of existing applications in EJB or JSP. Enterprise applications access functions and data associated with applications running on EISs. Application servers extend their containers and support connectivity to heterogeneous EISs. Enterprise tools and Enterprise Application Integration (EAI) vendors add value by providing tools and frameworks to simplify the EIS integration task. J2EE provides containers for client applications, web components based on servlets, JSPs and Enterprise JavaBeans (EJB) components.

Figure 1A:
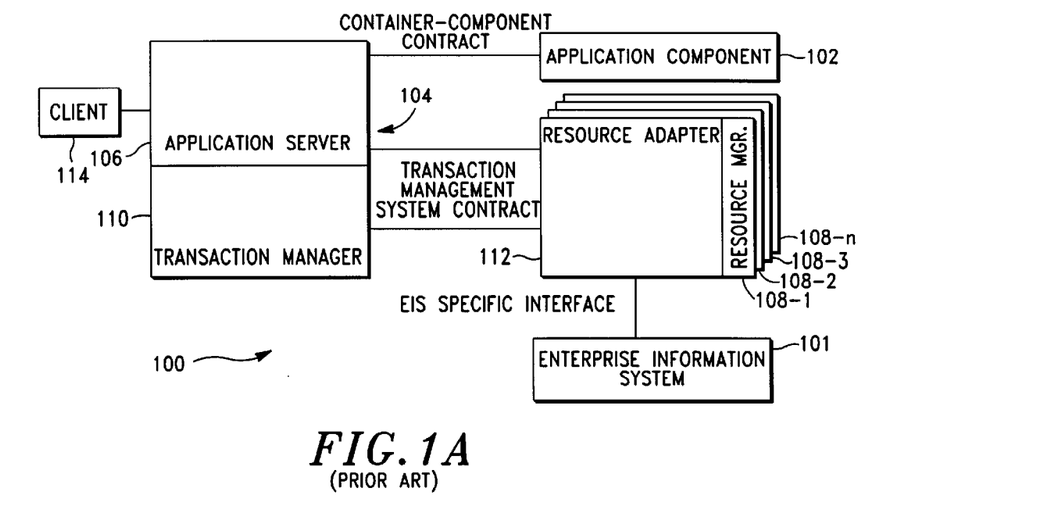
FIGS. 1A and 1B show the functional components involved in transaction processing in prior client-server computer systems.

FIG. 1A shows a high level block diagram of components involved in transaction management as performed in prior client server computer systems 101 implementing an EIS 101. An application component 102 is deployed in a container 104 provided by an application server 106. The application component 102 performs transactional access to multiple resource managers 108-1, 108-2, ..., 108-n, where n can be any number. The application server uses a transaction manager 110 to manage transactions across multiple resource managers 108. Each resource manager utilizes a corresponding resource adapter 112. Transaction manager 110 comprises a set of software modules that coordinates transactions across multiple resource managers. It also provides additional low-level services that enable transactional context to be propagated across systems. The services provided by transaction manager 110 are not visible directly to the application components 102.

Figure 1B:
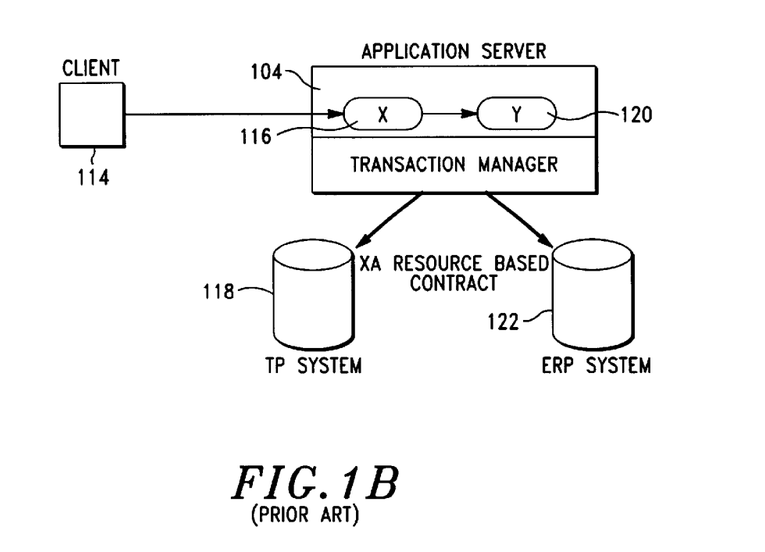

In FIG. B, an application client process 114 invokes EJB X 116 in a typical transaction. EJB X 116 accesses transaction programs managed by transaction processing system 118. EJB X 116 calls EJB Y 120 that accesses an ERP system 122. EJB X 116 and EJB Y 120 access the transaction processing system 118 and ERP system 122 using respective client access APIs for the two systems. The application server 106 enlists the connections to both systems (obtained from their respective resource adapters) as part of the transaction. When the transaction commits, transaction manager 110 perform a two phase commit protocol across the two resource managers 108. This ensures that the read/write access to resources managed by both transaction processing system 118 and ERP system 122 is either all committed, or all rolled back.

The resource managers 108 can support two types of transactions. Transactions controlled and coordinated by the transaction manager 110 external to the resource manager 108 are referred to as JTA transactions or XA transactions. The second type of transaction is managed internal to the resource manager 108. The coordination of such transactions involves no external transaction managers. As used herein, such transactions are referred to as local transactions. If a single resource manager instance participates in a transaction, the application server 106 uses the transaction manager 110 to manage the transaction. However, using the transaction manager 110 has a significant performance overhead. This overhead incurs a significant processing cost in typical EISs that perform a large number of transactions. Thus, there is a need for a solution that avoids the overhead of using an XA transaction with a single resource manager.

SUMMARY

The present invention defines a transaction management contract between an application server and a resource adapter and its underlying resource manager that allows an application server to utilize local transactions on a resource manager and avoid the overhead of an external transaction manager. As used herein, contract refers to responsibilities two individual software components have with respect to interacting with each other. The transaction management contract incorporates two aspects that apply to different types of transactions. The first aspect provides an application level transaction contract between a transaction manager and a resource manager based on javax.transaction.xa.XAResource of the J2EE specification. The J2EE specification is incorporated herein by reference in its entirety.

The second aspect is local transaction management contract. These contracts enable application server to provide the infrastructure and runtime environment for transaction management. An application component relies on this transaction infrastructure to support its component level transaction model.

DETAILED DESCRIPTION

Figure 2:
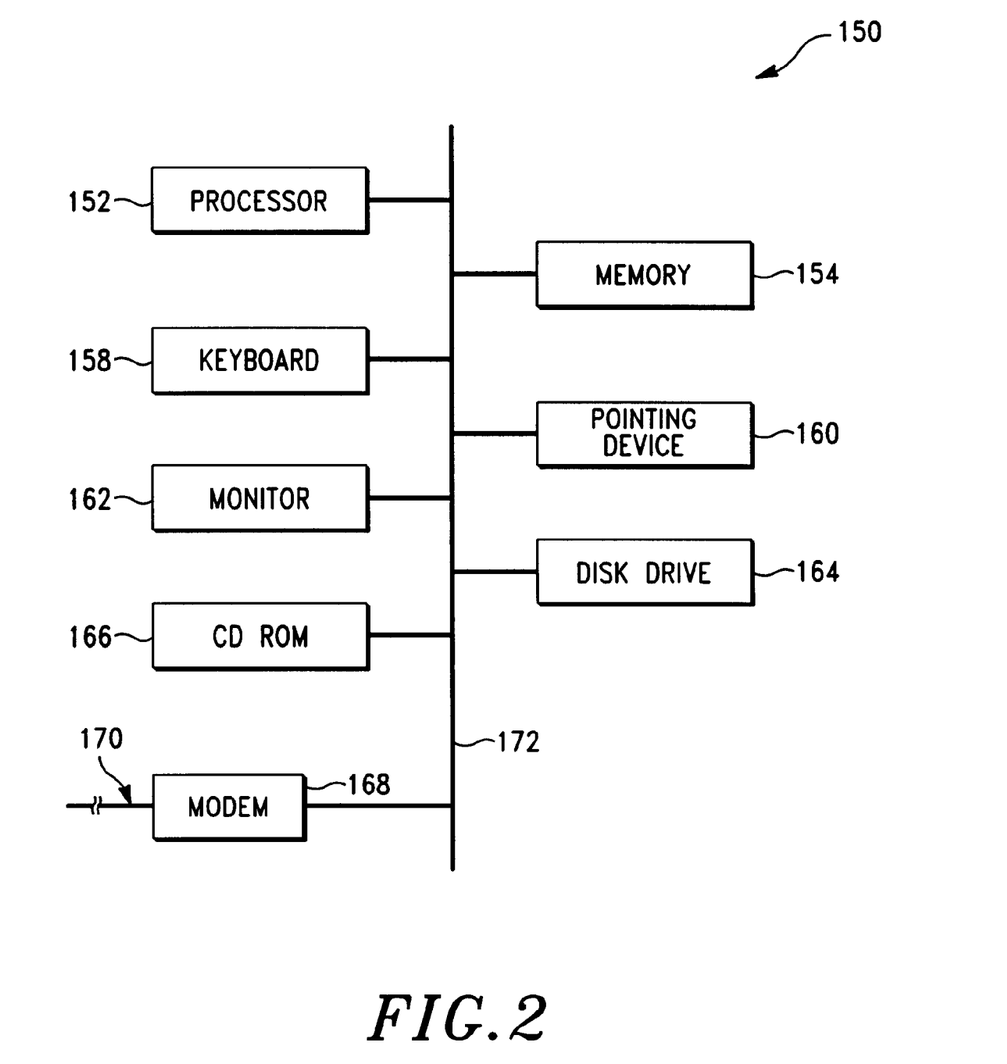
FIG. 2 illustrates in block diagram form the hardware utilized in a transaction management system according to the present invention.
Figure 3:
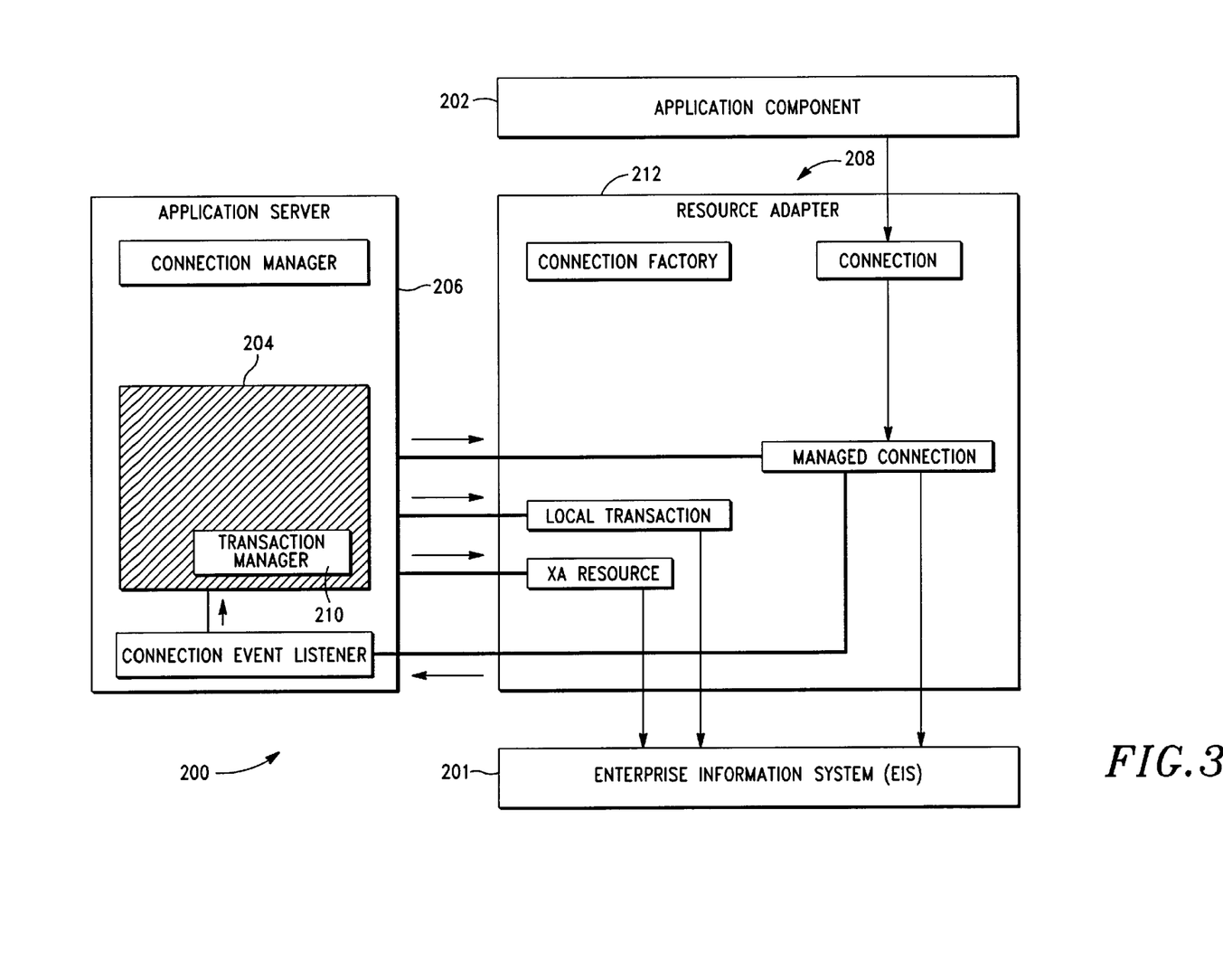
FIG. 3 illustrates in block diagram form the functional components of the present invention that allow an application server to manage local transactions on a resource manager.

Directing attention to the drawings, FIG. 2 is a high level block diagram of the hardware typically used in an embodiment of the present invention. Computer 150 incorporates a processor 152 utilizing a central processing unit (CPU) and supporting integrated circuitry. Memory 154 may include RAM and NVRAM such as flash memory, to facilitate storage of software modules executed by processor 152, such as transaction management system 200 (FIG. 3). Also included in computer 150 are keyboard 158, pointing device 160, and monitor 162, which allow a user to interact with transaction management system 200 during execution. Mass storage devices such as disk drive 164 and CD ROM 166 may also be in computer 150 to provide storage for transaction management system 200 and associated files. Computer 150 may communicate with other computers via modem 168 and telephone line 170 to allow transaction management system 200 to be operated remotely, or utilize files stored at different locations. Other media may also be used in place of modem 168 and telephone line 170, such as a direct connection or high speed data line. The components described above may be operatively connected by a communications bus 172.

Local Transaction Management Contract

Figure 4:
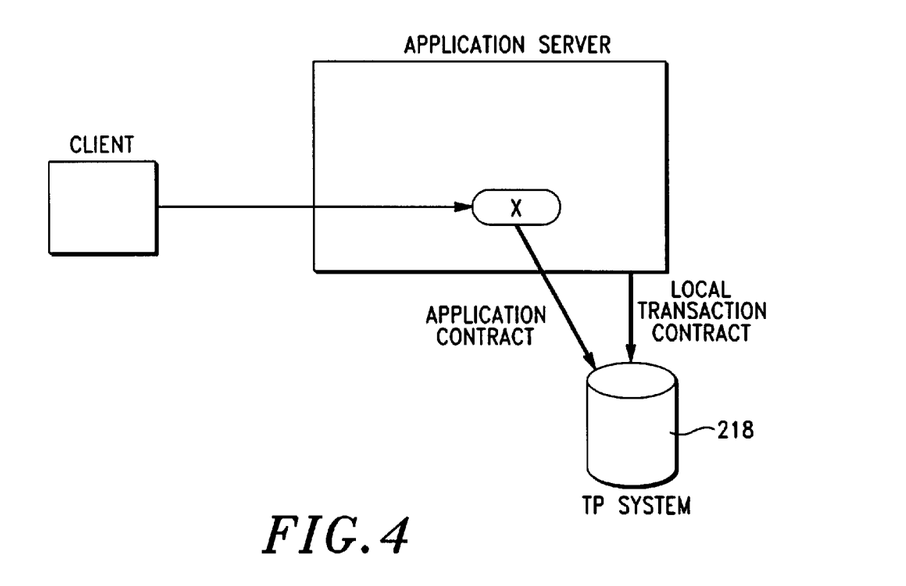
FIG. 4 illustrates an application server managing a local transaction on a resource manager.

The present invention defines a local transaction contract between application server and resource manager that enables the application server to manage resource manager local transactions, as shown in FIG. 4. The local transaction management contract has two aspects. In the first aspect, the application server uses the javax.resource.spi.LocalTransaction interface to manage local transactions transparently to an application component and to perform transaction optimizations. The second aspect of the contract relates to notifications for local transaction related events. If a resource adapter supports a local transaction demarcation API, for example, the javax.resource.cci.LocalTransaction for Common Client Interface, the resource adapter needs to notify application server of the events related to the local transaction, such as transaction begin, commit, and rollback.
Local Transaction Interface The javax.resource.spi.LocalTransaction interface defines the contract between an application server and resource adapter for the local transaction management. If a resource adapter supports the LocalTransaction interface, then the application server can choose to perform local transaction optimization (uses local transaction instead of a JTA transaction for a single resource manager case) for applications which allow use of this optimization.
ConnectionEventListener Interface An application server implements the javax.resource.spi.ConnectionEventListener interface. It registers this listener instance with the ManagedConnection instance by using ManagedConnection.addConnectionEventListener method. The following code example specifies the ConnectionEventListener interface related to the local transaction management contract:

```
public interface javax.resource.spi.ConnectionEventListener {
  // Local Transaction Management related events
  public void localTransactionStarted(ConnectionEvent event);
  public void localTransactionCommitted(ConnectionEvent event);
  public void localTransactionRolledback(ConnectionEvent event);
  // . . .
}
```

The ManagedConnection instance notifies its registered listeners for transaction related events by calling methods—localTransactionStarted, localTransactionCommitted, localTransactionRolledback.

The ConnectionEvent class defines the following types of event notifications related to local transaction management contract:

LOCAL_TRANSACTION_STARTED: notifies that a local transaction was started using the ManagedConnection instance.

LOCAL_TRANSACTION_COMMITTED: notifies that a local transaction was committed using the ManagedConnection instance.

LOCAL_TRANSACTION_ROLLEDBACK: notifies that a local transaction was rolled back using the ManagedConnection instance.

Local Transaction Optimization

An application component provider has to indicate to the container using a deployment descriptor whether local transaction optimization can be used or not by the container. This deployment hint is required because the container cannot unilaterally make a decision on whether or not to perform local transaction optimization. For example, when the container starts a transaction, it cannot find out (without a hint through the deployment descriptor) about the number of resource managers that will participate in this transaction. If a deployment descriptor indicates that a container can use local transaction optimization than the container can, but is not required to, use local transaction instead of JTA transaction when managing transactions.
Connection Sharing A connection typically maintains state specific to a client-security context, data/function access related data structures (example—query results). An application may want to share this connection state across multiple component instances or across methods on a single component instance. The connection sharing is very typical in non component based applications that just use a single connection under the same client context to access an EIS. When an application is developed using the J2EE component model, there is an issue related to how a connection is acquired and shared to achieve the functionality similar to that of an equivalent non-component based application. The connector architecture enables an application server to allow a connection and its state to be shared across multiple methods on a single component instance or across component instances. The connection sharing mechanism is transparent to the application components. To enable connection sharing, the application component provider/deployer has to provide a deployment hint to the container. This deployment hint indicates which methods and component instances will share a connection. The mechanism by which the connector architecture supports connection sharing is illustrated in the following scenarios. An application server can also support a mechanism to share connection state other than the local transaction association (for example, result set or prepared statements for database access) across methods or component instances. This mechanism is similar to the mechanism described in the following scenarios.

Scenario: Container-Managed Transaction Demarcation

Figure 5:
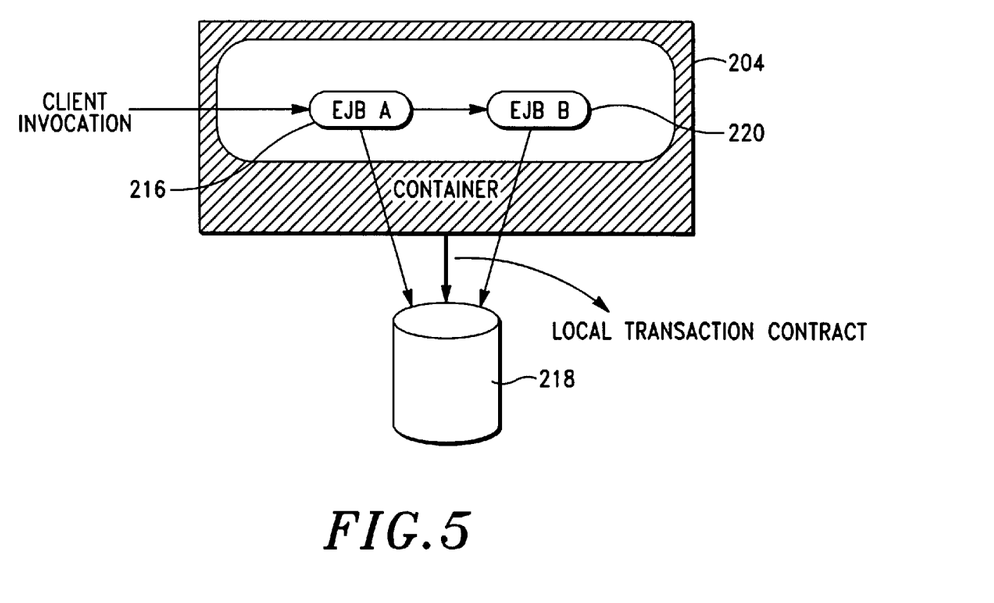
FIG. 5 illustrates an optimization of the application server managing local transactions on a resource manager
Figure 6:
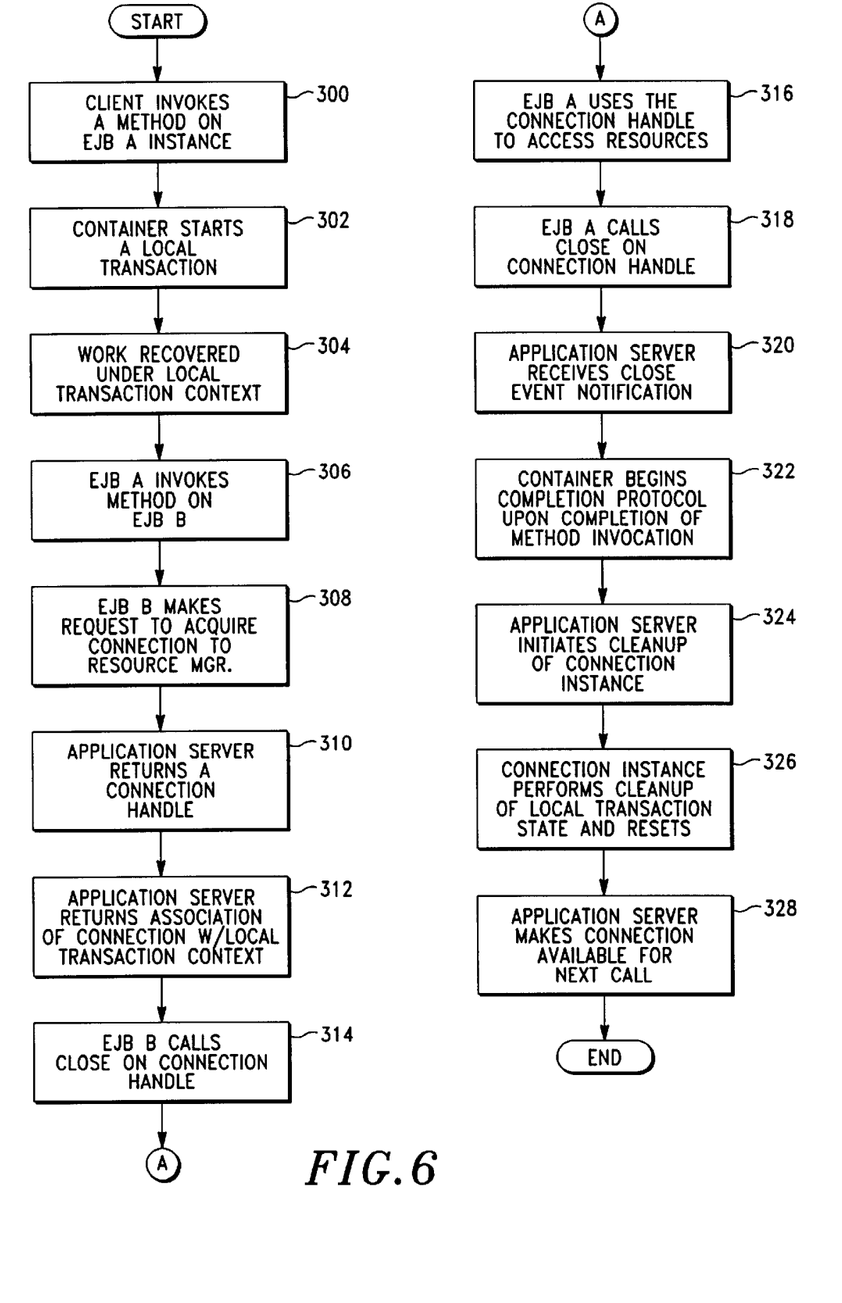
FIG. 6 illustrates a sequence of steps executed to perform local transaction management for a container-managed transaction demarcation.

In FIG. 5, the stateful session beans A 216 and B 220 have container-managed transaction demarcation with the transaction attribute set to Required. Both EJBs A 216 and B 220 access a single EIS resource manager as part of their business logic. Based on the deployment hint from the application component provider, the application server 206 has decided to perform local transaction optimization for method invocations on both EJBs 216 and 220. FIG. 6 illustrates the flow of steps executed in this scenario. Beginning at step 300 the client invokes a method on EJB A 216 with no transaction context. In its method implementation, the EJB A 216 acquires a connection to the EIS instance. At step 302, during the acquiring of the connection, the container starts a local transaction by invoking begin method on the javax.resource.spi.LocalTransaction instance. The local transaction is tied to the ManagedConnection instance that is associated with the connection handle (as acquired by the component in the previous step). At step 304, after start of the local transaction, any recoverable unit of work performed by the EJB A 216 on the EIS resource manager (using the acquired connection) is automatically included under the local transaction context. At step 306, the EJB A 216 now invokes a method on the EJB B 220. In this scenario, EJB A 216 does not call close on the connection handle before invoking method on EJB B 220 instance. An application server 206 is required to ensure that the connection sharing mechanism is equally applicable if the EJB A 216 were to close connection handle before calling EJB B 220. Continuing to step 308, in the invoked method, the EJB B 220 makes a request to acquire a connection to the same EIS resource manager. At step 310, the application server 206 returns a connection handle using the same ManagedConnection instance that was used for handling the connection request from the EJB A 216 instance. At step 312, the application server 206 retains the association of the ManagedConnection instance with the local transaction context across the method invocation from EJB A 216 to EJB B 220. This means that any unit of work that EJB B instance will perform on the EIS resource manager 208 using its acquired connection handle) will be automatically included as part of the current local transaction. The connection state (for example, any open cursors) can also be retained across method invocations when the local transaction association for a physical connection is being shared. At step 314, before method on EJB B 220 instance completes, the EJB B 220 calls close on the connection handle. The application server 206 should not initiate any cleanup of the physical connection at this time as there is still an uncompleted local transaction associated with the shared physical connection. In this scenario, the cleanup of a physical connection refers to dissociation of the local transaction context from the ManagedConnection instance. At step 316, upon regaining control, EJB A 216 can use the same connection handle (provided EJB A 216 had not called close on the connection handle) to access EIS resources; all recoverable unit of work on the EIS resource manager 208 will be included in the existing local transaction context. If EJB A 216 closes the connection handle before calling EJB B 220, and then reacquires the connection handle (on getting the control back), the application server 206 should ensure that the local transaction context stays associated with the shared connection. At step 318, the EJB A 216 eventually calls close on its connection handle. The application server 206 gets a connection close event notification. At step 320, since there is an uncompleted local transaction associated with the underlying physical connection, the application server 206 does not initiate a cleanup of the ManagedConnection on receiving the connection close event notification. The application server 206 still has to go through completion process for the local transaction. At step 322, when the business method invocation on EJB A 216 instance completes successfully without any application error, the container starts the completion protocol for the local transaction. The container calls LocalTransaction.commit method to commit the transaction. At step 324, after the local transaction is completed, the application server 206 initiates a cleanup (now there is no active local transaction) of the physical connection instance by calling ManagedConnection.cleanup method. The application server should initiate cleanup of the ManagedConnection instance in the case where EJB A 216 does not call close on the connection handle before returning. The application server 206 identifies this need for cleanup of ManagedConnection based on the scope of connection sharing defined through the deployment descriptor. At step 326, upon invocation of the cleanup method, the ManagedConnection instance does a cleanup of its local transaction related state and resets itself to a default state. At step 328, the application server 206 puts the physical connection back in to the pool for handling subsequent connection requests.

Figure 7:
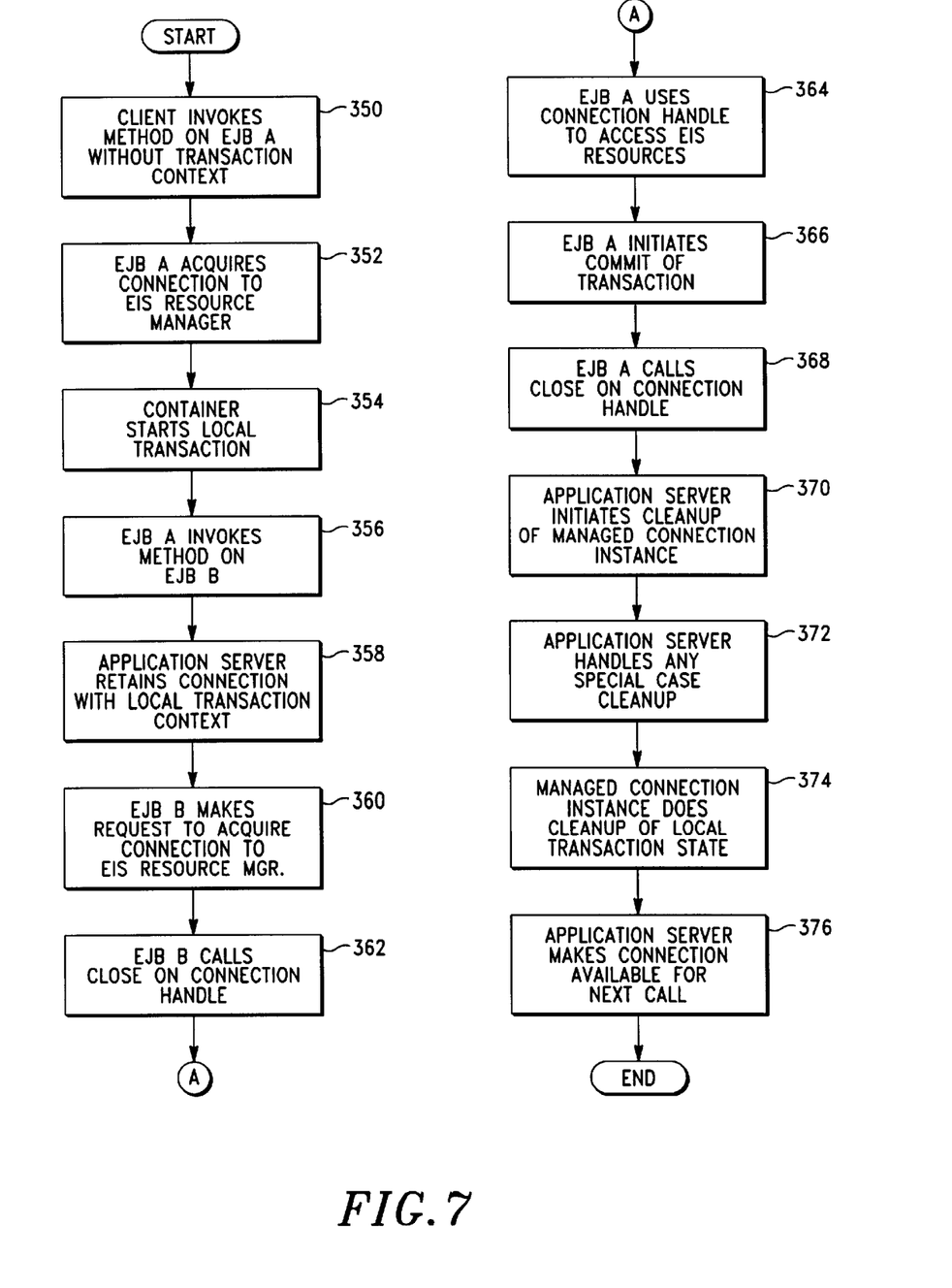
FIG. 7 illustrates a sequence of steps executed to perform local transaction management for a component-managed transaction demarcation.

Connection Scenario:

In a Component-Managed Transaction Demarcation scenario, both stateful session beans A 216 and B 220 do bean-managed transaction demarcation using JTA UserTransaction interface. Both EJBs A 216 and B 220 access a single EIS resource manager 208 as part of their business logic. Based on the deployment hint from the application component provider, the application server 206 has decided to perform local transaction optimization for the method invocations across EJBs A 216 and B 220. FIG. 7 illustrates the following sequence of steps in this scenario. At step 350, the client invokes a method on EJB A 216 with no transaction context. Since EJB A 216 will manage transactions itself, the container dispatches the method invocation to the EJB A 216 instance without any associated transaction context. At step 352, in its method implementation, the EJB A 216 instance acquires a connection to the EIS and then begins a transaction by invoking UserTransaction.begin method. Application server 206 should also support the case where a component invokes UserTransaction.begin method before acquiring a connection. At step 354, when EJB A 216 instance invokes UserTransaction.begin method, the container starts a local transaction on the physical connection (ManagedConnection instance) by calling LocalTransaction.begin method. To support this, the application server 206 provides an implementation of UserTransaction interface. The UserTransaction implementation delegates transaction demarcation calls to LocalTransaction instance if local transaction optimization is being used; in other cases, UserTransaction implementation delegates to the transaction manager 210. The container also starts managing the association of the local transaction context with the ManagedConnection instance. Any recoverable unit of work performed by the EJB A 216 instance on the EIS resource manager 208 is now automatically included under the local transaction context. At step 356, the EJB A 216 invokes a method on the EJB B 220 instance. EJB A 216 does not call close on the connection handle before invoking method on EJB B 220. At step 358, the application server 206 retains the association of the connection with the local transaction context across this method invocation from EJB A 216 to EJB B 220. This means that any unit of work that EJB B 220 instance will perform on the EIS resource manager 208 (in the invoked method) will be automatically included as part of the current local transaction. At step 360, the EJB B 220 instance makes a request to acquire a connection to the same EIS resource manager 208. The application server 206 returns a connection handle using the same ManagedConnection instance (which represents the physical connection) that was used for handling the connection request from EJB A 216 instance. The application server 206 retains the local transaction association with this ManagedConnection instance. At step 362, before the method on EJB B 220 instance completes, the EJB B 220 calls close on the connection handle. The application server 206 does not initiate any cleanup on the physical connection at this time as there is an uncompleted local transaction associated with the physical connection. At step 364, upon getting the control back, EJB A 216 can use the previously acquired connection handle (provided EJB A 216 had not previously called close on the connection handle) to access EIS resources; any recoverable unit of work on the EIS resource manager 208 will be included in the existing local transaction context. At step 366, the EJB A 216 instance calls UserTransaction.commit method to initiate commit of the transaction. The container handles this commit request successfully by calling the method LocalTransaction.commit to commit the local transaction. At step 368, EJB A 216 calls close on the connection handle. The application server 206 gets a connection close event notification. Since there is no local transaction associated with the ManagedConnection instance, the application server 206 initiates a cleanup of the ManagedConnection instance by calling ManagedConnection cleanup method. At step 370, if the EJB A 216 instance had called close on the connection handle before invoking UserTransaction.commit in the same method, then the application server 206 will not initiate any cleanup of the ManagedConnection instance on this connection close. The application server 206 initiates cleanup of the ManagedConnection only when the associated local transaction gets completed on UserTransaction.commit invocation. At step 372, the application server 206 identifies the need for initiating cleanup of ManagedConnection instance based on the scope of connection sharing defined using the deployment descriptor. If cleanup of ManagedConnection is needed, the application server should initiate cleanup even in the case where EJB A 216 has not called close on the connection handle before returning. At step 374, upon the cleanup method invocation, the ManagedConnection instance does a cleanup of its local transaction related state and resets itself to a default state. At step 376, the application server 206 puts the physical connection back in to the pool for handling subsequent connection requests.

Transaction Management Contract Requirements

A resource adapter can be classified as follows based on the level of transaction support:

1) Level NO_TRANSACTION: The resource adapter does not support either resource manager local or JTA transactions.

It does not implement either XAResource or LocalTransaction interfaces.

2) Level LOCAL_TRANSACTION: The resource adapter supports resource manager local transactions by implementing the LocalTransaction interface.

3) Level XA_TRANSACTION: The resource adapter supports both resource manager local and JTA transactions by implementing LocalTransaction and XAResource interfaces respectively. The above levels reflect the major steps of transaction support that a resource adapter needs to make in order to allow external transaction coordination. Depending on its transactional capabilities and requirements of its underlying EIS, a resource adapter can choose to support any one of the above transaction support levels.

An application server may be used to support resource adapters with all three levels of transaction support —NO_TRANSACTION, LOCAL_TRANSACTION, XA_TRANSACTION. The following are the requirements for an application server 206 for the transaction management contract:

1) application server 206 is required to support a transaction manager 210 that manages transactions using the JTA XAResource based contract. The application server 206 is required to use the LocalTransaction interface based contract to manage local transactions for a resource manager. The application server 206 is required to use deployment descriptor mechanism to discover the transactional capabilities of a resource adapter. Additionally, application server 206 can, but is not required to, support local transaction optimization, as well as support a connection sharing mechanism.

The following description describes how an application server 206 uses the event notifications from the resource adapter to manage local transactions and to restrict illegal transaction demarcations by an application component. In these scenarios, an application component starts a local transaction using an application level transaction demarcation interface (example: javax.resource.cci.LocalTransaction as defined in the CCI) supported by the resource adapter. The resource adapter in its implementation of the transaction demarcation interface sends event notifications related to the local transaction—namely, local transaction begin, commit and rollback. The application server gets notified of these local transaction related events through the ConnectionEventListener mechanism.

Local Transaction Cleanup

The following is a set of scenarios that illustrate the function of the present invention as related to the cleanup of local transactions.

Scenario 1: A stateless session bean with bean-managed transaction demarcation starts a local transaction in a method invocation. It returns from the business method without completing the local transaction. The application server implements the ConnectionEventListener interface. The resource adapter notifies the application server with LOCAL_TRANSACTION_STARTED event when the local transaction is started by the session bean instance. When the session bean instance returns from the method invocation without completing the local transaction, the application server detects this uncompleted local transaction as it has not received any matching LOCAL_TRANSACTION_COMMITTED or LOCAL_TRANSACTION_ROLLEDBACK event from the resource adapter.

On detecting a uncompleted local transaction, the application server terminates the stateless session bean instance and throws an exception to the client.

Scenario 2: The container terminates a component instance—for example, because of some system exception in a method invocation. On termination of a component instance, the application server cleans up all ManagedConnection instances being used by this component instance. The cleanup of a connection involves resetting all local transaction and client specific state. This state is maintained internal to the ManagedConnection instance. The application server initiates a cleanup of a ManagedConnection instance by calling ManagedConnection.cleanup. After the cleanup, the application server puts this connection back in to the pool to serve future allocation requests.

Transaction Interleaving

The application server is required to ensure that transactions are interleaved serially on a connection. The application server uses the connection event listener mechanism (specified through interfaces ConnectionEventListener and ConnectionEvent) to flag illegal cases of transaction demarcation. The application server is required to implement the Connection-EventListener interface to support this scenario.

A scenario for component-managed transaction demarcation is also included. Scenario: An EJB component (with bean managed transaction demarcation) starts a local transaction using the application-level transaction demarcation interface (example: javax.resource.cci.LocalTransaction as defined in the CCI) supported by the resource adapter. It then calls UserTransaction.begin method to start a JTA transaction before it has completed the local transaction. In this scenario, the EJB component has started but has not completed the local transaction. When the application component attempts to start a JTA transaction by invoking UserTrans-action.begin method, the application server detects it as a transaction demarcation error and throws an exception from the UserTransaction.begin.

When the application component starts the local transaction, the resource adapter notifies the application server of the LOCAL_TRANSACTION_STARTED connection event. When the component invokes UserTransaction.begin method, the application server detects it as an error condition as it has not received the matching LOCAL_TRANSACTION_COMMITTED or LOCAL_TRANSACTION_ROLLEDBACK event from the resource adapter for the currently active local transaction.

A transaction system that allows an application server to manage local transactions on a resource manager in a client server environment has been illustrated and discussed in detail. While there have been described above the principles of the present invention in conjunction with various embodiments, the foregoing description is made only by way of example and not as a limitation to the scope of the invention.

What is claimed is:

1. A method of managing local transactions in a computer system, the computer system having at least one application server, at least one client process, a resource adapter, an application component and an enterprise information system comprising computing resources, the application server having a first software module and a second software module, the application server having a container having a local transaction manager, a connection manager and a connection event listener, the resource adapter having a connection factory, a connection instance, a managed connection instance, a local transaction instance representing a local transaction, the local transaction having a local transaction context, the resource adapter having an XAResource, the method comprising the steps of:

the client process invokes method on the first software module;

the container initiates a local transaction;

the first software module invokes a method on the second software module;

the second software module makes request to acquire connection to the computing resource;

the application server retains a connection with the local transaction context;

the second software module calls close on the connection;

first software module uses the connection to access the computing resource;

first software module closes the connection;

the application server initiates cleanup of the connection instance; and the connection instance is made available for next connection request.

2. The method of claim 1, wherein work is recovered under the local transaction context between said step of the container initiates a local transaction and said step of the first software module invokes method on the second software module.

3. The method of claim 2, wherein the application server returns a connection handle between said step of the second software module makes request to acquire connection to the computing resource and said step of the application server retains connection with local transaction context.

4. The method of claim 3, wherein the application server receives close event notification between said step of the first software module closes connection and said step of the application server initiates cleanup of connection instance.

5. The method of claim 4, wherein the container executes a completion protocol upon completion of the method invocation between said step of the application server receives close event notification and said step of the application server initiates cleanup of the connection instance.

6. The method of claim 1, wherein the connection instance performs cleanup of the local transaction state and resets between said step of the application server initiates cleanup of the connection instance and said step of the connection is made available for the next connection request.

7. The method of claim 6, wherein the first software module acquires connection to the computing resource between said step of the client process invokes method on the first software module and said step of the container initiates a local transaction.

8. The method of claim 7, wherein the first software module initiates commit of the transaction between the first software module uses the connection to access the computing resource and said step of the first software module closes the connection.

9. The method of claim 8, wherein the application server performs cleanup of the managed connection instance between said step of the application server initiates cleanup of the connection instance and said step of the connection is made available for the next connection request.

10. The method of claim 9, wherein the managed connection instance performs cleanup of the local transaction state between said step of the application server performing special case cleanup and said step of the connection is made available for the next connection request.

11. A computer readable medium for use in a computer system, the computer system having at least one application server, at least one client process, a resource adapter, an application component and an enterprise information system comprising computing resources, the application server having a first software module client process and a second software module client process, the application server having a container having a local transaction manager, a connection manager and a connection event listener, the resource adapter having a connection factory, a connection instance, a managed connection instance, a local transaction instance representing a local transaction, the local transaction having a local transaction context, the resource adapter having an XAResource, the computer readable medium containing instructions, which, when executed by a computer, manage local transactions by performing the steps of:

the client process invokes method on the first software module;

the container initiates a local transaction;

the first software module invokes a method on the second software module;

the second software module makes request to acquire connection to the computing resource;

the application server retains a connection with the local transaction context;

the second software module calls close on the connection;

first software module uses the connection to access the computing resource;

first software module closes the connection;

the application server initiates cleanup of the connection instance; and the connection instance is made available for next connection request.

12. A computer system having an application server, a resource adapter, an application component and an enterprise information system, the application server having: first and second software modules, a connection manager, a container, the container having a transaction manager, and a connection event listener; the resource adapter having: a connection factory, a connection instance, a managed connection, a local transaction, and a XAResource; the application server in communication with the local transaction instance, the application server in communication with the managed connection instance, the local transaction manager in communication with the XAResource, the application component in communication with the connection instance, the connection instance in communication with the managed connection instance, the managed connection instance in communication with the enterprise information system, the managed connection instance in communication with the connection event listener, the managed connection instance in communication with the application server, such that transactions between the application server and the resource adapter are handled by the local transaction manager.

* * * * *